US010913136B2

(12) United States Patent
Gellenthien et al.

(10) Patent No.: US 10,913,136 B2
(45) Date of Patent: Feb. 9, 2021

(54) APPARATUS FOR MACHINING A COMPONENT AND METHOD OF MACHINING

(71) Applicant: Siemens Aktiengesellschaft, Munich (DE)

(72) Inventors: Heiko Gellenthien, Berlin (DE); Andreas Griese, Berlin (DE); Thomas Klemke, Berlin (DE); Pascal Piasecki, Gelsenkirchen (DE)

(73) Assignee: SIEMENS AKTIENGESELLSCHAFT

( * ) Notice: Subject to any disclaimer, the term of this patent is extended or adjusted under 35 U.S.C. 154(b) by 51 days.

(21) Appl. No.: 15/777,342

(22) PCT Filed: Nov. 8, 2016

(86) PCT No.: PCT/EP2016/076943
§ 371 (c)(1),
(2) Date: May 18, 2018

(87) PCT Pub. No.: WO2017/102180
PCT Pub. Date: Jun. 22, 2017

(65) Prior Publication Data
US 2018/0326548 A1 Nov. 15, 2018

(30) Foreign Application Priority Data

Dec. 16, 2015 (EP) ..................................... 15200522

(51) Int. Cl.
*B23Q 3/06* (2006.01)
*B23Q 3/10* (2006.01)
(Continued)

(52) U.S. Cl.
CPC ............. *B23Q 3/063* (2013.01); *B23Q 3/104* (2013.01); *B25B 1/2405* (2013.01); *B25B 5/14* (2013.01); *B25B 5/163* (2013.01)

(58) Field of Classification Search
CPC ........ B24B 49/00; B23Q 3/063; B23Q 3/104; B23Q 3/066; B25B 5/163; B25B 5/14;
(Continued)

(56) References Cited

U.S. PATENT DOCUMENTS 5,193,314 A * 3/1993 Wormley ................ B24B 19/14
451/11
5,645,466 A 7/1997 Wikle
(Continued)

FOREIGN PATENT DOCUMENTS

DE 4116979 A1 11/1992
DE 102007049862 A1 4/2009
(Continued)

OTHER PUBLICATIONS

PCT International Search Report and Written Opinion of International Searching Authority dated Apr. 10, 2017 corresponding to PCT International Application No. PCT/EP2016/076943.
(Continued)

*Primary Examiner* — Dung Van Nguyen
(74) *Attorney, Agent, or Firm* — Schmeiser, Olsen & Watts LLP

(57) ABSTRACT

An apparatus for machining a component is provided. The apparatus includes a fixation mechanism, wherein the fixation mechanism includes a first fixation member with a first fixation face and a second fixation member with a second fixation face, wherein the first fixation face and the second fixation face are arranged and configured such that different bearing surfaces of a plurality of different components can be fixed between the first fixation member and the second (Continued)

fixation member, wherein the apparatus further includes a machining device, and wherein the apparatus is configured to machine a machining surface of the respective component by means of the machining device and according to a predetermined accuracy. Further, a method of machining the component is presented.

19 Claims, 6 Drawing Sheets

(51) Int. Cl.
*B25B 1/24* (2006.01)
*B25B 5/14* (2006.01)
*B25B 5/16* (2006.01)

(58) Field of Classification Search
CPC .......... B25B 1/2405; B25B 1/18; B25B 1/20; B25B 1/2431; B25B 1/12442; Y10T 29/49998
USPC ..................................... 451/5, 8–10, 365, 28
See application file for complete search history.

(56) References Cited

U.S. PATENT DOCUMENTS

| | | | | |
|---|---|---|---|---|
| 6,568,993 | B1 * | 5/2003 | Jones | .................... B23Q 3/063 269/238 |
| 6,652,369 | B2 * | 11/2003 | Jones | .................... B23Q 3/063 269/238 |
| 2005/0091846 | A1 | 5/2005 | Powers et al. | |
| 2010/0170081 | A1 * | 7/2010 | Kuroda | .................. B23Q 3/066 29/559 |

FOREIGN PATENT DOCUMENTS

| | | |
|---|---|---|
| DE | 102014101628 A1 | 8/2015 |
| EP | 1806477 A2 | 7/2007 |
| WO | WO 2013/126126 | 8/2013 |

OTHER PUBLICATIONS

European Search Report for EP Application No. 15200522.9, dated Sep. 21, 2016.

* cited by examiner

| SIZE | b1 | b2 | b3 | b5 | e | h₆ | h₇ |
|---|---|---|---|---|---|---|---|
| SFM4 | 7,37 | 10,69 | 11,73 | 11,57 | 6,78 | 1,26 | 4,13 |
| SFM5 | 9,72 | 13,86 | 15,02 | 14,86 | 8,58 | 1,40 | 5,13 |
| SFM6 | 11,8 | 17,1 | 18,69 | 18,53 | 10,72 | 1,92 | 6,54 |
| SFM6-WIDE | 14,80 | 20,1 | 21,69 | 21,53 | 13,72 | 1,92 | 6,54 |
| SFM7 | 14,75 | 21,37 | 23,32 | 23,16 | 13,32 | 2,35 | 8,14 |
| SFM7-WIDE | 17,75 | 24,37 | 26,32 | 26,16 | 16,32 | 2,35 | 8,14 |
| SFM8 | 18,93 | 27,22 | 29,57 | 29,41 | 16,97 | 2,84 | 10,14 |
| SFM8-WIDE | 24,93 | 33,22 | 35,57 | 35,41 | 22,97 | 2,84 | 10,14 |
| SFM9 | 21,45 | 30,72 | 33,14 | 32,98 | 18,59 | 2,92 | 11,35 |
| SFM10 | 23,79 | 34,39 | 37,36 | 37,2 | 21,21 | 3,59 | 12,95 |
| SFM10-WIDE | 26,79 | 37,39 | 40,36 | 40,2 | 24,21 | 3,59 | 12,95 |
| SFM11 | 26,8 | 38,4 | 41,6 | 41,44 | 23,83 | 3,86 | 14,15 |
| SFM11-WIDE | 29,8 | 41,4 | 44,6 | 41,44 | 26,83 | 3,86 | 14,15 |
| SFM13 | 29,49 | 42,75 | 46,51 | 46,35 | 26,47 | 4,54 | 16,15 |

FIG 10

| SIZE | b1 | b2 | b3 | b5 | e | $h_6$ | $h_7$ |
|---|---|---|---|---|---|---|---|
| SWM4 | 35,39 | 44,92 | 47,69 | 47,51 | 30,52 | 3,34 | 12,15 |
| SWM4-60 | 29,49 | 37,43 | 39,73 | 39,56 | 25,42 | 2,78 | 10,13 |
| SWM5 | 32,15 | 41,68 | 44,45 | 44,27 | 27,28 | 3,34 | 12,15 |
| SWM5-60 | 26,79 | 34,73 | 37,03 | 36,86 | 22,72 | 2,78 | 10,13 |
| SWM6 | 28,55 | 38,08 | 40,85 | 40,67 | 23,68 | 3,34 | 12,15 |
| SWM6-60 | 23,79 | 31,73 | 34,03 | 36,86 | 19,72 | 2,78 | 10,13 |
| SWM7 | 28,55 | 36,08 | 38,06 | 37,88 | 23,72 | 2,39 | 9,75 |
| SWM7-60 | 23,79 | 30,07 | 31,72 | 31,54 | 19,77 | 1,99 | 8,13 |

FIG 11

| |
|---|
| SWM4<br>SWM5<br>SWM6<br>SWM7 |
| SFM5<br>SFM6<br>SFM7 |
| SFM8<br>SFM9<br>SFM10<br>SFM10-WIDE<br>SFM11 |
| SF5<br>SF6<br>SF7 |
| SF8<br>SF9<br>SF10<br>SF10-WIDE<br>SF11 |

APPARATUS FOR MACHINING A COMPONENT AND METHOD OF MACHINING

CROSS-REFERENCE TO RELATED APPLICATIONS

This application claims priority to PCT Application No. PCT/EP2016/076943, having a filing date of Nov. 8, 2016 based off of European application No. 15200522.9 having a filing date of Dec. 16, 2015, the entire contents of both of which are hereby incorporated by reference.

FIELD OF TECHNOLOGY

The present invention relates to an apparatus for machining a component such as a grinding machine for a turbine component, e.g. a blade or vane of a compressor of a gas turbine.

BACKGROUND

Typically, gas turbine engines are formed from a combustor positioned upstream from a turbine blade assembly and a compressor. The compressor is formed from a plurality of compressor vanes and/or blades coupled to stator rings or discs.

Compressor vanes are known from WO 2013/126126 A2 for example.

Usually, compressor vanes comprise a trapeze or wedge-shaped root section which requires to be post-machined prior to the assembly of the vane or vane root to the overall turbine and/or the stator ring. Particularly, the vane root or root section to be fitted to a corresponding groove in the stator ring. For the machining, e.g. of a lower surface or machining surface of the vane root, belt grinders are applied. A particular demand is posed by the machining accuracy and reproducibility in the machining of surface. After the vane root has been machined and adapted to the corresponding root, the vane is usually inserted into the stator ring from a downstream side of the turbine.

Along with the demand for a flexible application of gas turbines and other turbo machines, there is a growing demand to embody machining apparatuses applied in e.g. the machining of the compressor vane roots in a more universal and versatile way. At the same time the requirements for the machining accuracy have to be met.

SUMMARY

An aspect relates to providing a means by which components such as compressor vanes can be machined universally and with a certain or predetermined accuracy. Particularly, an improved apparatus for machining said component is provided, which is e.g. movable and/or transportable.

An aspect of the present disclosure relates to an apparatus for machining a component, such as a compressor vane. The apparatus comprises a fixation mechanism which comprises a first fixation member with a first fixation face and a second fixation member with a second fixation face. Said fixation faces are preferably faces or surfaces of the respective fixation member by which said component can be retained for a machining operation such as a grinding operation.

Alternatively, the machining operation may be cutting or milling or any other machining technique.

The first fixation face and the second fixation face are arranged and configured such that different bearing surfaces or a plurality of different bearing surfaces of a plurality of different components can be fixed or clamped between the first fixation member and the second fixation member.

In an embodiment, the first fixation member is displaceable with respect to the second fixation member or vice versa. Thereby it may be achieved that the component can indeed be arranged between the first fixation member and the second fixation member and the component can finally be fixed reliably by the fixation mechanism.

The mentioned bearing surfaces expediently relate to opposing bearing surfaces of the component such that each of the bearing surfaces can be retained or abut only one of the first or the second fixation face.

The apparatus further comprises a machining device for machining the component.

The apparatus is configured to machine a machining surface of the respective component with the machining device according to a predetermined accuracy. Said machining device may be or comprise a slide with a ceramic striking material. The machining device may be a pot or belt grinder, for example.

Said machining surface is preferably a lower surface of the root of the component which preferably extends between the bearing surfaces of the component. The machining surface may be that surface of vane root of the compressor vane which is to be machined for the adaption to the corresponding groove, e.g. in the stator rings of the turbine.

Said plurality of different components preferably relates to different designs, shapes or standards of compressor vanes or the vane roots thereof.

As an advantage of embodiments of the present invention, the apparatus can be applied in a versatile and universal way as it may be used for the machining or adaption of a plurality of different vanes or blades, such as compressor vanes, wherein for each of said vanes the required machining or fabrication accuracy can be met.

In an embodiment, the apparatus is configured to be movable and/or transportable. In this way the machining device may—according to the specific demands—be applied at different fabrication sites or facilities of turbines, for example.

In an embodiment, the predetermined accuracy of the machining amounts to 0.04±0.02 mm. Said accuracy is preferably measured and/or measurable by means of a specific inspection equipment.

The first fixation face and the second fixation face each comprises two subfaces.

In an embodiment, the two subfaces of the first fixation face and the two subfaces of the second fixation face are inclined at an angle greater than 90° to each other, respectively. Owing to the mentioned inclination of the two subfaces of each of the first fixation face and the second fixation face, it may be achieved that the component, such as the compressor vane, may be retained and or fixed between the first fixation member and the second fixation member in a particular expedient way. According to the configuration of the first fixation face and the second fixation face, the component may be partly surrounded by the first fixation member and the second fixation member.

The two subfaces of the first fixation face and the two subfaces of the second fixation face are even in shape. This allows particularly the fixation of the plurality of different components or the bearing surfaces thereof between the first and the second fixation member as e.g. bearing surfaces of different components can be fixed easiest and in a reliable way.

In an embodiment, the two subfaces of the first fixation face and the two subfaces of the second fixation face are inclined at an angle between 115° and 118°, such as of 116.7°, to each other, respectively.

In an embodiment, the two subfaces of the first fixation face and the two subfaces of the second fixation face are inclined at an angle between 112° and 115°, such as of 113.25°, to each other, respectively.

In an embodiment, the apparatus is configured to machine the machining surface of the component such that the machining surface of the component has a surface roughness between 2.5 µm and 16 µm.

In an embodiment, the apparatus comprises a rack. The rack may be or comprise a cage partly housing the machining device. Thereby, it may be achieved that the apparatus is accessible from the outside, e.g. for repair or specific adjustment actions. Moreover, the apparatus may be constructed in a compact and rigid way which is particularly important in the present field of apparatuses.

In an embodiment, the apparatus is surrounded by the rack.

In an embodiment, the apparatus comprises a base and the apparatus is configured such that the machining device and/or the rack is/are fixable, preferably reversibly, fixable onto or to the base for an operation, such a normal operation or application of the apparatus.

In an embodiment, the apparatus is configured such that the machining device and/or the rack is/are demountable from the base, e.g. for a transportation of the apparatus.

In an embodiment, the machining device is arranged vertically above the machining surface for the machining operation. This arrangement offers the advantage that, for the application of the machining or grinding forces, gravity is helpful. Moreover, in this way, it is unlikely that gravity influences the accuracy for the machining operation.

In an embodiment, the machining device is arranged horizontally beside the machining surface for the machining operation.

In an embodiment, the apparatus has a weight of less than 350 kg. As an advantage of this embodiment, the apparatus may particularly be embodied portable and/or transportable.

In an embodiment, the apparatus is configured such that the fixation mechanism is tiltable with respect to the machining device.

In an embodiment, the apparatus is configured such that it can be arranged and transported on a euro-pallet. This provides a major advantage in terms of shipment and versatility of the apparatus over known concepts of machining apparatuses for compressor vanes, for example.

In an embodiment the apparatus is a grinding machine.

In an embodiment, the component is a vane or blade of a turbine, such as a compressor of a gas turbine and the machining surface is the surface of a root of said vane or blade.

A further aspect of the present embodiments of the invention relate to a method of machining the component with the described apparatus comprising the machining device and the fixation mechanism, wherein the method comprises mounting the machining device onto a base of the apparatus. Said mounting of the machining device may relate to a preparation of the apparatus for a machining operation.

The method further comprises mounting a component of the apparatus for the machining operation, wherein bearing surfaces of the component are fixed between a first fixation member and a second fixation member of the fixation mechanism. Further, the method comprises machining a machining surface of the component according to the predetermined accuracy.

As an advantage, particularly due to the releasable mount or fixation, the apparatus is compact and applicable in a versatile way, such as transportable or movable to different sites where a machining of compressor vane components is required. As compared to localized or stationary machining tools, the overall machining concept of e.g. compressor vanes is significantly improved. Particularly, the described apparatus can be used or applied at a plurality of different fabrication sites, e.g. for turbines. Moreover, the accuracy of machining may as well be improved by the presented method.

In an embodiment, after the machining of the machining surface, the machining device is demounted or demountable from the base for a transportation of the apparatus. For said transportation, the apparatus is preferably arranged on a pallet, such as a euro-pallet.

In an embodiment, the result of the machining operation, e.g. of a compressor vane, is surveyed with a first inspection device for inspecting an extent or dimension of the component and with a second inspection device for inspecting a dimension of a further component to which the mentioned component is to be mounted, e.g. after the machining operation. Preferably, the further component is a rotor or stator ring of a turbine, to which the component, particularly the compressor vane, is to be fitted or mounted after the machining operation. The dimension of the component preferably relates to a longitudinal extent of the vane root which may be decreased by a machining of the machining surface as described above. On the other hand, the dimension of the further component preferably relates to a depth of a vane groove of the mentioned stator ring to which the vane root of the compressor vane is assembled.

Features, embodiments and/or advantages mentioned in combination with the described apparatus may as well pertain to the described method and vice versa.

Further features, expediencies and advantageous refinements become apparent from the following description of the exemplary embodiment in connection with the figures.

BRIEF DESCRIPTION

Some of the embodiments will be described in detail, with reference to the following figures, wherein like designations denote like members, wherein:

FIG. 10 shows a table of exemplary dimensions of the vane root of FIG. 8 and the fixation members of FIG. 9;

FIG. 11 shows a table of root size indications of compressor vanes;

DETAILED DESCRIPTION

Figure 1:
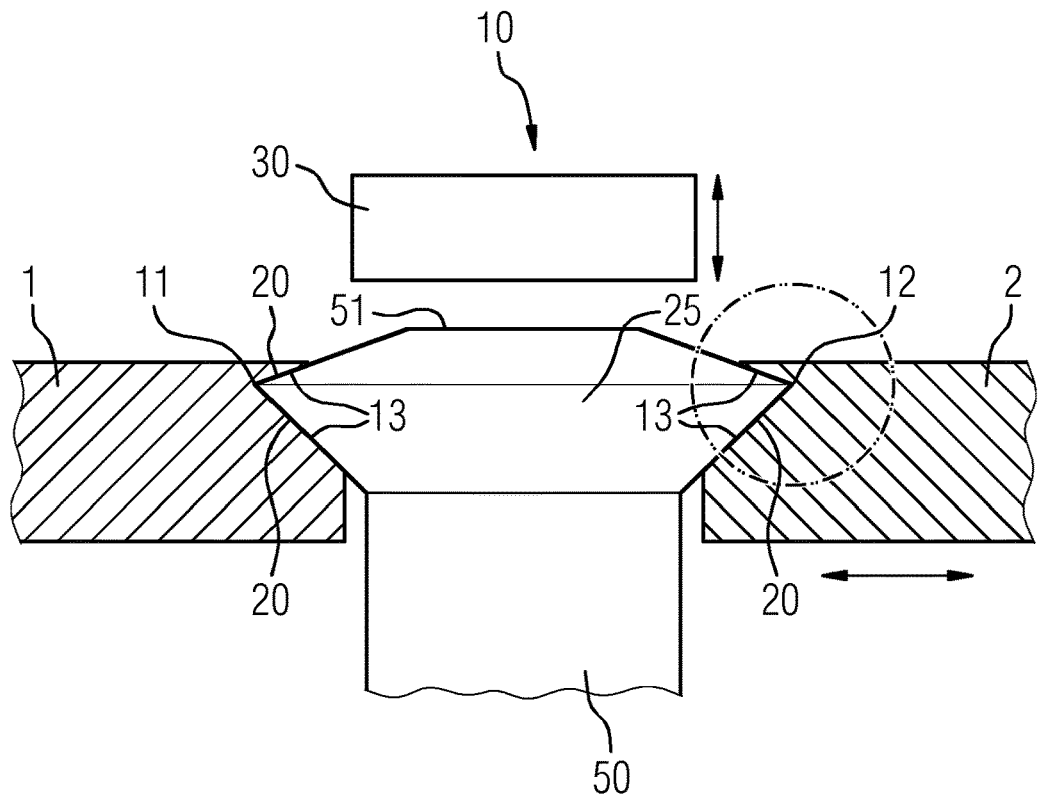
FIG. 1 shows a schematic of a fixation mechanism for fixing a component.

FIG. 1 shows, in a schematic, and as a part of an apparatus 100 (cf. FIG. 12) a fixation mechanism 10. The fixation mechanism 10 is configured to fix or clamp a component 50. The component 50 is preferably a turbine component, such as a compressor vane or corresponding vane root of a turbine. Particularly, a vane root or root section (not explicitly indicated) of the compressor vane is fixed by the fixation mechanism 10 and may be denoted by numeral 50. Said vane root may have a trapeze-like shape as indicated in FIG. 1. A vane hook of the component 50 is indicated with numeral 25. An air foil section of the mentioned component 50 or as the case may be the compressor vane may extend downwards in FIG. 1.

The fixation mechanism 10 comprises a first fixation member 1 and a second fixation member 2. The first fixation member 1 and the second fixation member 2 may each be or comprise clamping jaws for clamping, retaining or fixing the component 50 or parts thereof.

The second fixation member 2 is preferably displaceable with respect to the first fixation member 1 which may be stationary. Said displacement may relate to a horizontal direction as indicated by the arrow under the second fixation member 2 in FIG. 1. The indications of the fixation members may as well be vice versa such that the first fixation member 1 may be displaceable with respect to a stationary second fixation member 2.

The mentioned displacement may be necessary in order to arrange and reliably clamp or fix the component between the first and the second fixation member 1,2.

The first fixation member 1 comprises a first fixation face 11. The second fixation member 2 comprises a second fixation face 12. The first and the second fixation face 11, 12 each comprise two subfaces 13 by means of which the component 50 can be fixed or retained. Each of the mentioned subfaces 13 is preferably even in shape in order to abut bearing surfaces of the component 50 for the fixation. Said bearing surfaces—indicated with numeral 20 are preferably also even in shape.

The component 50 can be fixed or clamped between the first fixation member 1 and the second fixation member 2 with a, e.g. predetermined, force Said force can expediently be applied hydraulically and or by further mechanical means known to a skilled person.

The fixation mechanism 10 may further be tilted, e.g. by an angle of ±3°, e.g. with respect to a horizontal axis (not explicitly indicated). Thus, an overall tilt of 6° or even more with respect to the machining device 30 may be achieved.

As indicated in FIG. 1, the apparatus 100 further comprises a machining device 30. The machining device 30 may be a pot grinder or belt grinder for machining a machining surface 51 of the component 50. The machining surface 51 may denote a root surface or lower surface of the component 50. The machining device 30 is arranged vertically above the component 50 or as the case may be the machining surface 51.

The apparatus 100 and/or the machining device 30 are preferably configured to machine or grind the machining surface 51 of the component 50 according to a predetermined accuracy. The predetermined accuracy may relate or amount to 0.04±0.02 mm. Moreover, the apparatus 100 and/or the machining device 50 are preferably configured to machine the machining surface 51 of the component 50 such that the machining surface 51 of the component has a surface roughness between 2.5 μm and 16 μm only.

The machining device 30 may e.g. be a CNC tool and/or computer-controlled in order to achieve the described accuracies. However, preferably, the machining device is controlled and/or operated manually.

The first fixation face 11 and the second fixation face 12 are preferably arranged and configured such that bearing surfaces of a plurality of different components can be fixed between the first fixation member 1 and the second fixation member 2. Thereby, it may be achieved that the apparatus can be applied in a universal and versatile way as e.g. only one machining apparatus is required for the machining of a plurality of different standard-sized or -shaped compressor vanes (cf. FIGS. 5 to 11 below).

Figure 2:
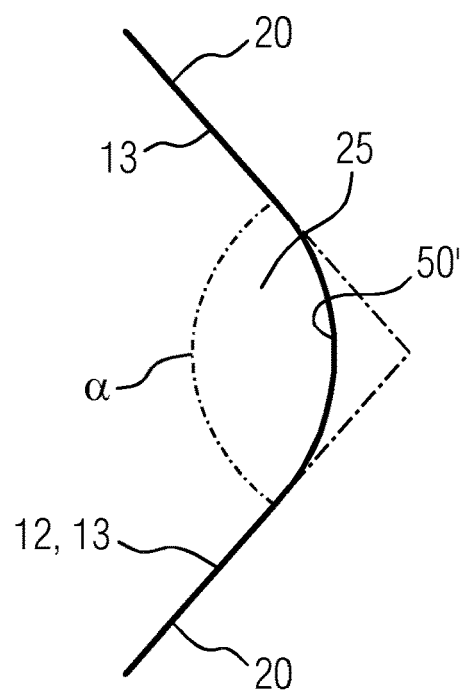
FIG. 2 shows a schematic of a magnified section of a fixation member and the component as shown in FIG. 1.

FIG. 2 shows a magnified schematic of a magnified section of FIG. 1 marked therein by the dashed circle. Particularly, a part of the second fixation member 2 is shown. The details shown in FIG. 2 may relate mutatis mutandis as well to the fixation of the component 50 by the first fixation member 1 (cf. FIG. 3). An opening angle α is indicated between the two subfaces 13 of the second fixation face 12. For a reliable fixation or clamping of the component 50, the bearing surfaces 20 of the component 50 are expediently also inclined by the same angle. The angle α is preferably greater than 90°.

Figure 5:
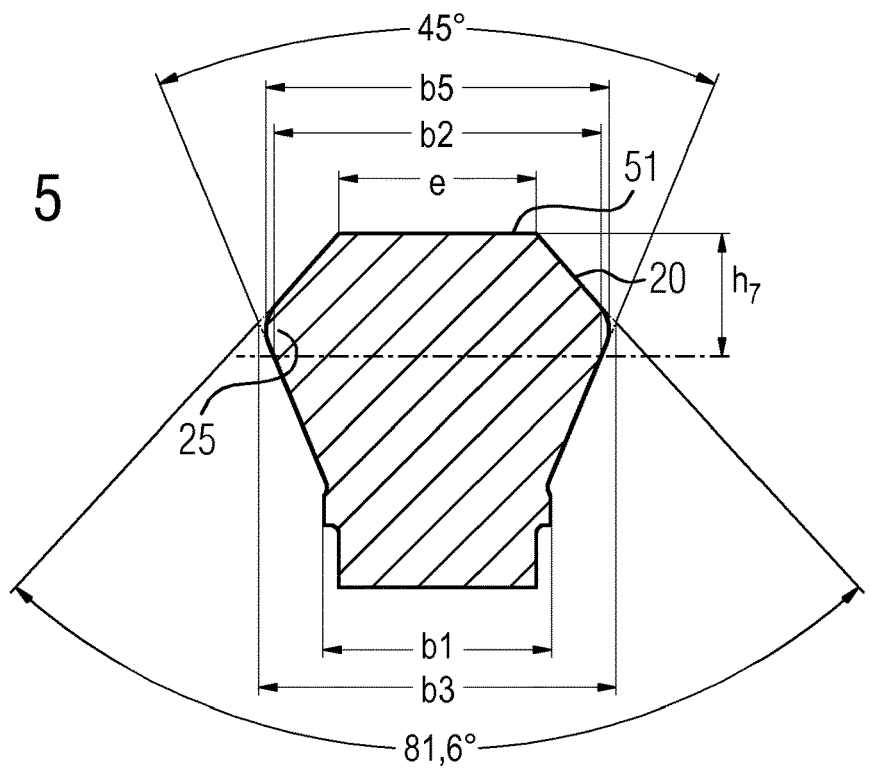
FIG. 5 shows an engineering drawing of a vane root according to a first embodiment.
Figures 6, 7:
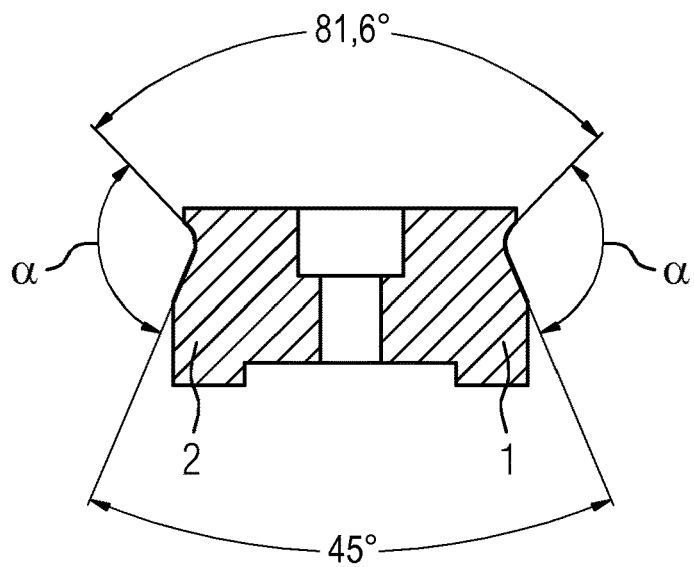
FIG. 6 shows an engineering drawing of at least parts of fixation members according to the first embodiment.
FIG. 7 shows a table of exemplary dimensions of the vane root of FIG. 5 and the fixation members of FIG. 6.

According to a first embodiment of the component 50 and/or the first and the second fixation members 1, 2, α preferably amounts to 116.7° (cf. FIGS. 5 to 7).

Figure 8:
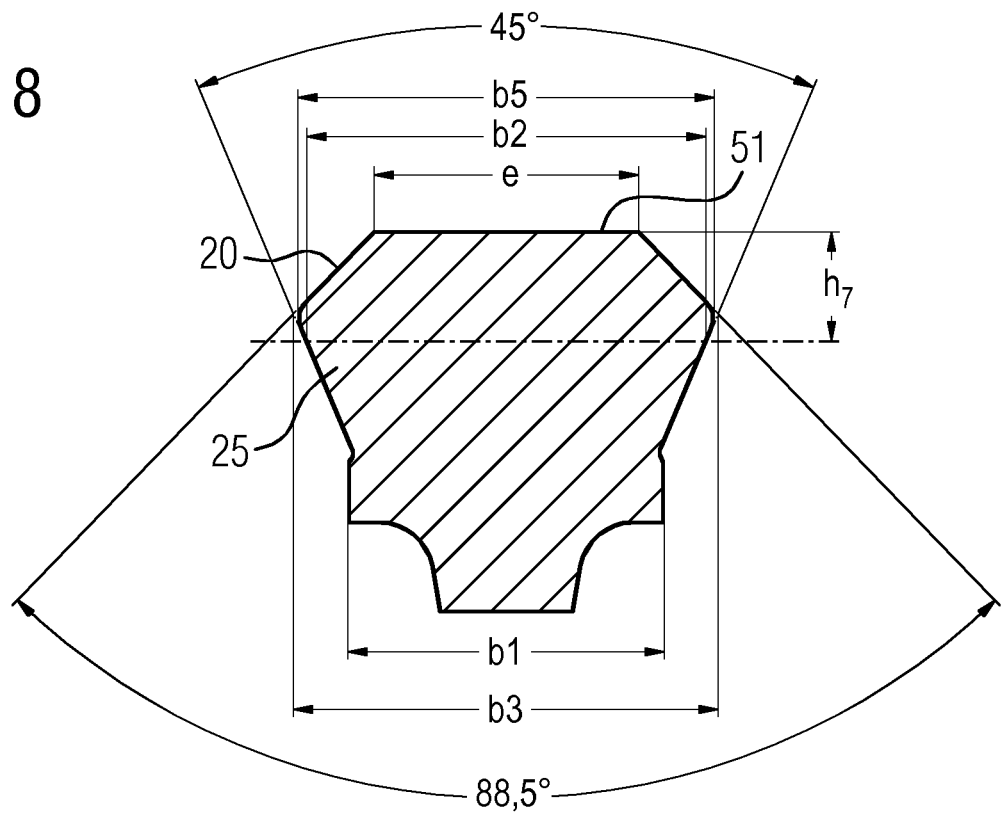
FIG. 8 shows an engineering drawing of a vane root according to a second embodiment.
Figure 9:
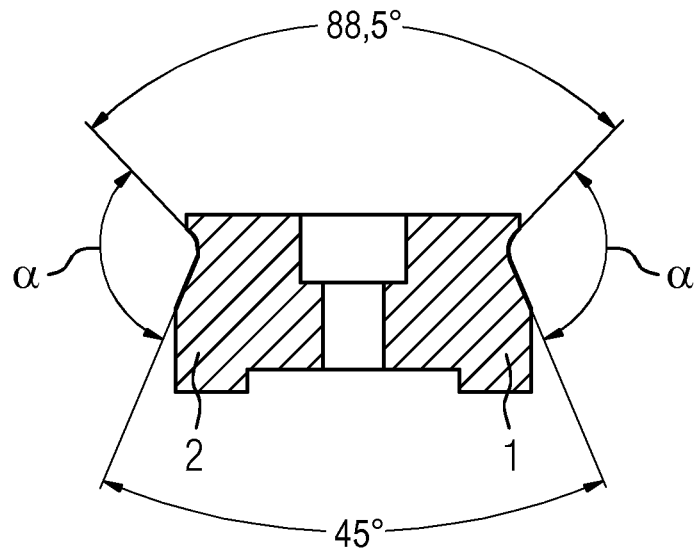
FIG. 9 shows an engineering drawing of at least parts of fixation members according to the second embodiment.

According to a second embodiment of the component 50 and/or the first and the second fixation members 1, 2, α preferably amounts to 113.25° (cf. FIGS. 8 to 10).

These angles may particularly be expedient for standard or common bearing surfaces of vane roots. Accordingly, the bearing surfaces of the different components may also incline the mentioned angles with respect to each other and according to the mentioned embodiments (cf. FIGS. 5 and 8 below).

The component 50 as shown in FIG. 2 may have a curvature at the outermost side as indicated. The geometry of the component in this region, i.e. regions, wherein the component 50 does not abut the subfaces 13, may differ among the various standards, sizes or embodiments of the component 50 (cf. dimensions h6, b3, b5 in FIGS. 5 and 8, respectively). Nevertheless, said various components may be retained or fixed by the fixation mechanism 10 with the same reliability, reproducibility and accuracy.

Figure 3:
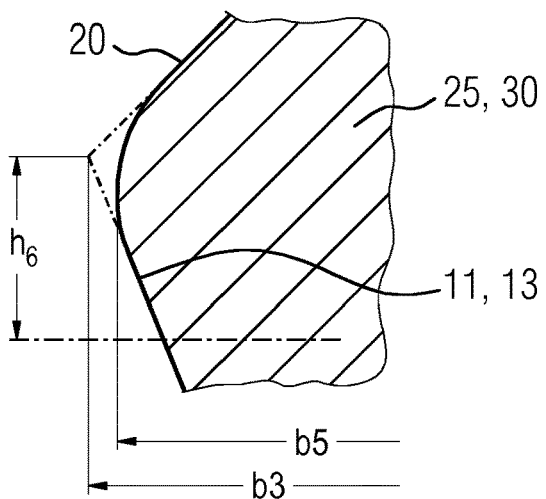
FIG. 3 shows exemplary dimensions of a fixation member and the component.

FIG. 3 shows a part of the vane hook 25 and/or the component 50. The dashed lines on the left indicate the subfaces 13 of the first fixation face 11. Thus, a situation may be indicated, wherein the component 50 is being or is to be machined by the apparatus 100.

In FIG. 3, specific measures or dimensions h6, b3 and b5 are indicated. By means of these dimensions, the different standard sizes or shapes of compressor vanes 50 may differ without affecting the fixture during the machining operation in the apparatus 100 (cf. FIGS. 7 and 10 below).

Figure 4:
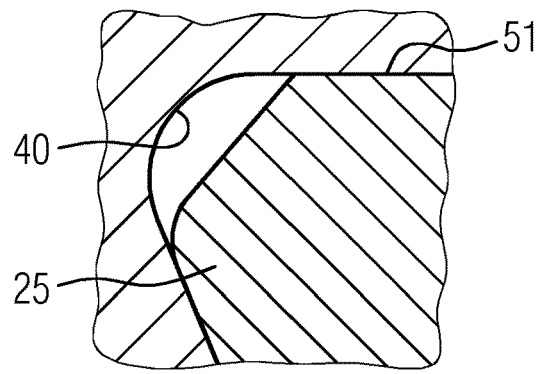
FIG. 4 shows parts of the component and a groove.

FIG. 4 shows parts of an exemplary vane root and/or component 50 assembled to a vane groove 40, e.g. a vane groove of a stator ring to which the vane root and/or component 50 is mounted or is to be mounted. It can be observed from FIG. 4, that the machining surface 51 has to accurately fit to the corresponding vane groove. In this way, care must be taken not to remove access material which would prevent the component 50 from being inserted into the vane groove 40.

FIG. 5 shows—by means of at least parts of an exemplary vane root—specific measures and dimensions, such as b2, b3, b5 and h7 by which compressor vane root sizes of the standards or shapes SFM4 to SFM13 may be distinguished from each other (cf. therefore FIG. 7). Furthermore, dimensional values in mm are indicated.

FIG. 6 shows—by means of two fixation members, i.e. a first and a second fixation member as described specific dimensional values in mm.

FIG. 7 shows values in mm of the dimensions indicated in FIGS. 3 and 5.

Particularly, when observing e.g. the columns of the b5-values (cf. FIG. 3), it becomes apparent that a plurality of different components or vane roots of compressor vanes or as the case may be their bearing surfaces 20 can be fixed between the first fixation member 1 and the second fixation member 2 (cf. FIGS. 1 and 2).

FIGS. 8 to 10 indicate, analogous to FIGS. 5 to 7 the situation of the second embodiment or second standard of compressor vane root sizes, wherein—due to the dimensions or extents of the corresponding component 50—another or different pair of fixation members 1, 2 has to be conducted and/or mounted to the apparatus 100.

FIG. 8 shows—by means of at least parts of an exemplary vane root—specific measures and dimensions, such as b2, b3, b5 and h7 by which compressor vane root sizes of the standards or shapes SWM4 to SWM7-60 may be distinguished from each other (cf. therefore FIG. 10). Furthermore, dimensional values in mm are indicated.

FIG. 9—by means of two fixation members, i.e. a first and a second fixation member as described specific dimensional values in mm.

FIG. 10 shows values in mm of the dimensions indicated in FIGS. 3 and 8. Particularly, when observing the columns of the dimensions b5-values (cf. FIG. 3), it becomes apparent that a plurality of different components or vane roots of compressor vanes or as the case may be its bearing surfaces 20 can be fixed between the first fixation member 1 and the second fixation member 2 (cf. FIGS. 1 and 2).

The table of FIG. 11 summarizes different vane root shapes or sizes which can be machined by means of the presented apparatus. The terms SWM4 to SWM7 which are listed one below the other in the column of FIG. 11 pertain to the above-mentioned first embodiment, wherein the terms SFM5 to SFM11 pertain to the second embodiment as mentioned above. Thereby, however, two different pairs of clamping jaws and/or fixation members may have to be applied, viz. one pair of fixation members for the shapes SFM5 to SFM7 and other pair of fixation members for the shapes SFM8 to SFM11. Moreover, the remaining shape terms SF5 to SF11 which may pertain to further shapes, e.g. of conventional or non-trapeze-like shaped vane roots may as well be clamped by the described fixation mechanism 10 preferably with two further pairs of fixation members. Thus, in summary, five different pairs of jaws or fixation members may allow for a reliable clamping of 20 different vane root geometries.

Figure 12:
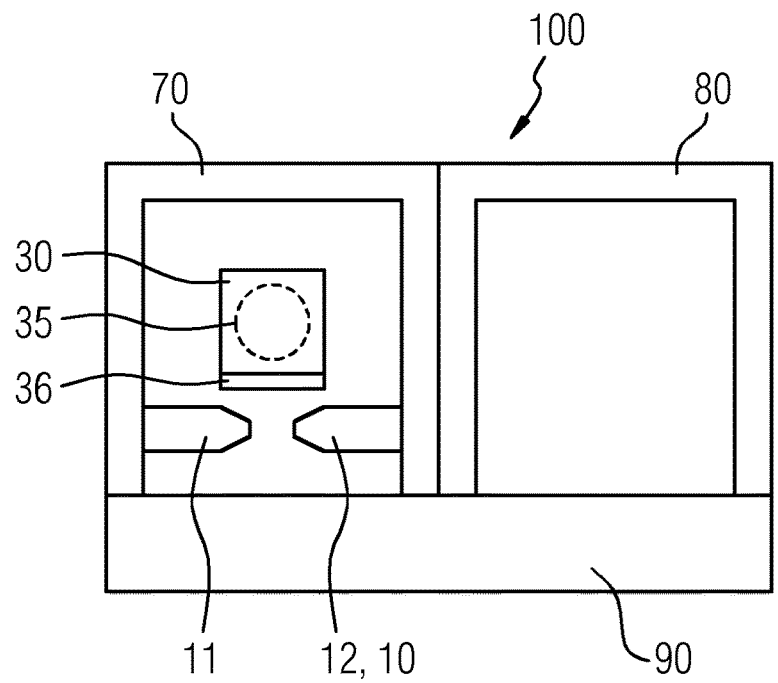
FIG. 12 shows a simplified schematic of an apparatus for machining the component in a first state.
Figure 13:
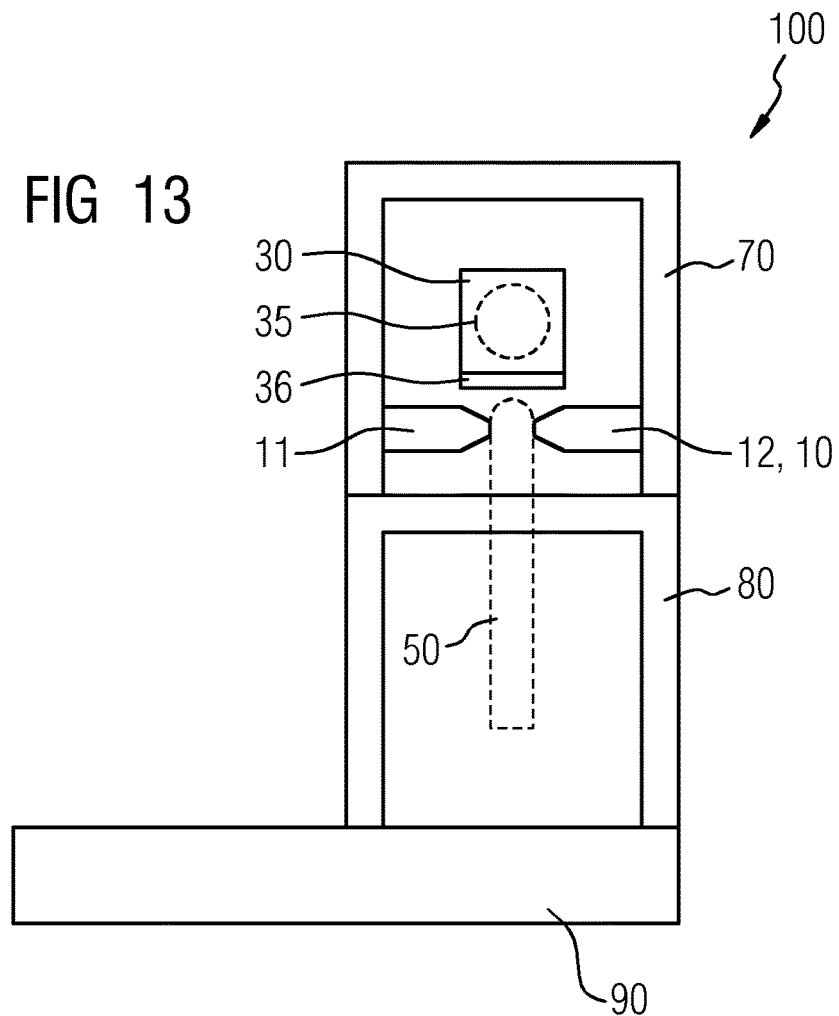
FIG. 13 shows a simplified schematic of an apparatus for machining the component in a second state.

By means of FIGS. 12 and 13, the depicted apparatus 100 is described in more detail. Additionally, a method of machining the component 50 with the apparatus 100 is described.

FIG. 12 shows a simplified schematic of an apparatus 100 in a first state, preferably a state according to which the apparatus 100 can be shipped or transported. Therefore, the apparatus 100 is disposed on a pallet 90. The apparatus 100 comprises the fixation mechanism 10 and the machining apparatus 30 as e.g. shown in FIG. 1. The apparatus 100 further comprises a rack 70 which at least partly houses or surrounds the fixation mechanism 10 as well as the machining device 30. At the same time, the rack 70, preferably, protects the mentioned components from external influences, such as shocks during a transportation of the apparatus 100. The rack 70 may constitute or comprise a welded construction for the required stability during a machining operation. A component 50 is not explicitly indicated in FIG. 12. The fixation mechanism 10 as well as the machining device 30 are expediently fixed to the rack 70.

The apparatus 100 further comprises—in or in the vicinity of the machining device 30—an electric drive 35 for driving the machining device 30. The electric drive 35 is preferably designed for a supply voltage of 230 V or 400 V at frequencies of 50 Hz or 60 Hz, for example. The electric drive 35 may further comprise an induction machine (not explicitly indicated). The electric drive 35 and/or the machining device 30 may, in turn, have a protective casing.

For the machining, the machining device 30 may be borne movable or displaceable via a slide and comprise a ceramic striking surface 36 or comparable means known by a skilled person. Preferably, the whole root surface of the vane root of the component 50 can be machined or grinded by the machining device 30.

The machining device 30 may further comprise grinding discs for providing the striking surface 36. Said grinding discs may in turn be mounted via a key fitting connection. The grinding discs may comprise a ceramic such as corundum. The grinding discs may further have a diameter of 200 mm. Moreover, the machining device 30 may be displaceable or movable with a vernia or fine-adjustment of an accuracy of 40 μm. Preferably, the machining device 30 is controlled and/or moved manually in the vertical as well as in the horizontal direction for the machining operation of the component 50.

As an alternative to grinding, the machining device may be a cutting or milling device.

The apparatus 100 further comprises a base 80. The base 80 is also arranged on the pallet 90 beside the rack 70 along with the machining device 30.

Preferably, the apparatus 100 is configured such that the machining device 30 and/or the rack 70 is/are fixable onto the base for a normal operation of the apparatus 100. Said fixation pertains to any expedient, preferably releasable, fixation means known in the art.

In FIG. 13, the apparatus is indicated in a second state, being different from the first state. Particularly, the second state pertains to a normal operation of the apparatus 100, such as a machining operation of the component which is actually to be machined.

Preferably, the apparatus 100 is further configured such that the machining device 30 and/or the rack 70 can be demounted from the base for a transportation or shipment of the apparatus 100, as described.

The pallet 90 as mentioned above preferably allows for an easy shipment of the apparatus 100, e.g. from one fabrication side to another, where a specific post machining of compressor vanes is actually required. Preferably, the pallet 90 is a euro-pallet. The dimensions of the apparatus 100 are expediently chosen such that the apparatus 100 can indeed be replaced and transported on such euro-pallet.

Originating from the state as shown in FIG. 12, the described method comprises preparing the apparatus 100 for a machining operation, wherein the machining device 30 or the rack 70 and the base 80 are already arranged on the pallet 90. Then, as described, the rack 70 is mounted onto the base 80.

In FIG. 12, the apparatus is shown without a component mounted thereto. However, when a component is mounted (see dashed contour in FIG. 13), the machining device is preferably arranged above the respective machining surface 51.

Alternatively, the apparatus may be configured such that, when the machining device 30 and/or the rack 70 is mounted on the base 80, the machining device 30 is arranged horizontally beside the machining surface for the machining operation, for example.

Thus, the described method further comprises mounting of the component 50 and/or the compressor vane to the apparatus 100 for the machining operation, wherein the bearing surfaces 20 are fixed between the first fixation member 1 and the second fixation member 2 of the fixation mechanism 10 (cf. FIGS. 1 and 2).

When the component 50 has been mounted to the apparatus and/or fixed by the fixation mechanism 10, the method expediently comprises machining of the machining surface 51 of the component 50 according to the described predetermined accuracy.

After the machining, the machining device 30 and/or the rack 70 are preferably demounted from the base 80 for a transportation of the apparatus 100, wherein the apparatus 100 is arranged on a pallet 90, as shown in FIG. 12.

During or after the machining, the method may further comprise surveying or checking a result of the machining with a first inspection device for inspecting e.g. a height of the vane root (cf. FIG. 3) and with a second inspection device for inspecting e.g. a depth of the vane groove 40 of a stator ring to which the component 50 is to be mounted after the machining operation (cf. FIG. 4).

Alternatively, the mentioned depth of the vane groove and a height of the vane root may be inspected and/or measured by the same inspection device.

The described method advantageously allows for a significant improvement in terms of versatility and scope of application of the apparatus. This is particularly owed to the described fixation mechanism as well as transportable design as described in the various embodiments of the apparatus and/or the method.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An apparatus for machining a component, wherein the component is a vane or a blade of a turbine, comprising a fixation mechanism, wherein the fixation mechanism comprises a first fixation member with a first fixation face and a second fixation member with a second fixation face, wherein the second fixation member is displaceable with respect to the first fixation member, wherein the first fixation face and the second fixation face each comprise two subfaces which are even in shape, wherein the first fixation face and the second fixation face are arranged and configured such that different bearing surfaces of a plurality of different components can be fixed between the first fixation member and the second fixation member and wherein the first fixation face and the second fixation face are shaped with at least one of specific measures or dimensions for standard sizes or shapes of at least one of a vane or blade of a turbine to abut a substantial portion of the first fixation or second fixation face during machining, wherein the apparatus further comprises a machining device,
wherein the apparatus is configured to machine a machining surface of the respective component by the machining device and according to a predetermined accuracy, and
wherein the apparatus further comprises a rack, wherein the machining device is surrounded by the rack.

2. The apparatus according to claim 1, wherein the two subfaces of the first fixation face and the two subfaces of the second fixation face are inclined at an angle between 115° and 118°, to each other, respectively.

3. The apparatus according to claim 1, wherein the two subfaces of the first fixation face (11) and the two subfaces of the second fixation face are inclined at an angle between 112° and 115°, to each other, respectively.

4. The apparatus according to claim 1, wherein the predetermined accuracy of the machining amounts to 0.04±0.02 mm.

5. The apparatus according to claim 1, which is configured to machine the machining surface of the component such that the machining surface of the component has a surface roughness between 2.5 μm and 16 μm.

6. The apparatus according to claim 1, wherein the apparatus comprises a base and the apparatus is configured such that the machining device is fixable onto the base for an operation of the apparatus.

7. The apparatus according to claim 6, wherein the apparatus is configured such that the machining device is demountable from the base for a transportation of the apparatus.

8. The apparatus according to claim 1, which is configured such that it can be arranged and transported on a euro-pallet.

9. The apparatus according to claim 1, wherein the apparatus is a grinding machine.

10. The apparatus according to claim 1, wherein the machining surface is a surface of a root of said vane or blade.

11. A method of machining a component with an apparatus comprising a rack a machining device surrounded by the rack, and a fixation mechanism, wherein the method comprises:

providing a fixation mechanism with a first fixation face and a second fixation face shaped with at least one of specific measures or dimensions for standard sizes or shapes of at least one of a vane or blade of a turbine to abut a substantial portion of the first fixation or second fixation face during machining,
mounting the machining device and the rack onto a base,
mounting a component to the apparatus for the machining operation, wherein bearing surfaces of the component are fixed between the first fixation member and the second fixation member of the fixation mechanism without affect of the vane or the blade during machining, and machining a machining surface of the component according to a predetermined accuracy.

12. The method according to claim 11, wherein after the machining of the machining surface, the machining device is demounted from the base for a transportation of the apparatus, wherein the apparatus is arranged on a pallet.

13. The apparatus according to claim 10, wherein the turbine is a compressor of a gas turbine.

14. The method according to claim 12, wherein the pallet, is a euro-pallet.

15. A kit for machining components of a turbine comprising:
- a transportable or movable rack;
- a machining device mounted on the transportable or movable rack adapted to be used at different fabrication sites or facilities of turbines, wherein the machining device is surrounded by the transportable or movable rack; and
- a plurality of fixation members operably attachable to the machining device, each of the plurality of fixation members having a different geometry for a reliable clamping of different pairs of vanes or blades of a turbine, wherein each of the plurality of fixation members has a respective fixation face which is shaped with at least one of specific measures or dimensions for standard sizes or shapes of at least one of a vane or blade of a turbine to abut a substantial portion of the respective fixation face during machining.

16. The kit of claim 15, wherein the kit includes five different fixation members which allow for a reliable clamping of twenty different vane root geometries.

17. The kit of claim 15, wherein the transportable or movable rack protects the machining device during transportation.

18. The kit of claim 15, wherein the transportable or movable rack further comprises a slide or a ceramic striking surface.

19. The kit of claim 15, further comprising grinding discs for providing striking surfaces.

* * * * *